United States Patent [19]
Lobb et al.

[11] Patent Number: 5,810,680
[45] Date of Patent: Sep. 22, 1998

[54] COMPUTER AIDED GAME APPARATUS

[75] Inventors: Lawrence Patrick Lobb; Brandon Scott Lobb; Craig Ryan Spradling, all of Houston, Tex.

[73] Assignee: Lawrence P. Lobb, Houston, Tex.

[21] Appl. No.: 682,421

[22] Filed: Jul. 17, 1996

[51] Int. Cl.$^6$ .................................................. G01C 21/00
[52] U.S. Cl. ........................................................ 473/407
[58] Field of Search ................................ 473/406, 407, 473/131; 364/449.1, 449.2, 449.7, 410, 460

[56] References Cited

U.S. PATENT DOCUMENTS

| | | | |
|---|---|---|---|
| 4,136,394 | 1/1979 | Jones et al. | 364/561 |
| 4,783,071 | 11/1988 | Tattershall | 273/32 H |
| 4,815,020 | 3/1989 | Cormier | 364/709 |
| 5,044,634 | 9/1991 | Dudley | 273/32 R |
| 5,046,839 | 9/1991 | Krangle | 356/5 |
| 5,214,679 | 5/1993 | Metcalf | 377/5 |
| 5,245,537 | 9/1993 | Barber | 364/410 |
| 5,294,110 | 3/1994 | Jenkins et al. | 273/32 H |
| 5,298,904 | 3/1994 | Olich | 342/42 |
| 5,319,548 | 6/1994 | Germain | 364/410 |
| 5,326,095 | 7/1994 | Dudley | 273/32 |
| 5,364,093 | 11/1994 | Huston et al. | 273/32 |
| 5,434,789 | 7/1995 | Fraker et al. | 364/460 |
| 5,438,518 | 8/1995 | Bianco et al. | 364/460 |
| 5,469,175 | 11/1995 | Boman | 342/357 |
| 5,507,485 | 4/1996 | Fisher | 473/407 |
| 5,524,081 | 6/1996 | Paul | 364/460 |

OTHER PUBLICATIONS

Quinnell, Richard A., "Directionally Dyslexic? Dont't Worry: The car knows the way", EDN, Dec. 21, 1995, pp. 37–40, 42.
Sharp Electronics, "The World According to Sharp," Electronic Design, Apr. 15, 1996.
Trunck, Bruce, Symbios Logic, "Digital Pen Technology", EDN Products Edition, Dec. 18, 1995, p. 35.
Landmark GolfProducts, Inc., Product Brochure and Spec. Sheet for PROLINX (1996).
Pacific Communication Sciences, Inc.Brochure for PC11503T—Modem IC for AT&T PACT NPCS System (1995).

*Primary Examiner*—George Manuel
*Attorney, Agent, or Firm*—Pravel, Hewitt, Kimball & Krieger

[57] ABSTRACT

A computer aided game apparatus is disclosed for tracking location and distance on a golf course, recommending club selection, recording golfer performance statistics, receiving notification via a pager, and playing infomercials during the course of a golf game. The apparatus has a processor connected to a memory which is suitably supports a geographic information system (GIS), a player performance database, and an infomercial database. The apparatus has a global positioning receiver which operates in conjunction with the GIS for indicating the current position of the golfer. The GPS receiver is connected to the processor which in turn drives a convenient, intuitive touch screen display. The apparatus has a pager which allows for direct contact with the golfer. To support data networking, the microprocessor is also connected to one or more interface ports, including an infra-red port, a parallel port, a serial port, and a PCMCIA port. Through the interface ports, the microprocessor can maintain, update, or back-up data stored in the memory. Typically, data not already present on the memory are downloaded from a central computer before each game is played. At the end of each game, statistics generated during the game are uploaded into the central computer system for archival purposes. As the game progresses, the apparatus of the present invention integrates the distance computation, the recording of the golfer performance, and the suggesting of proper club selection based on distance and past performance. Further, the apparatus of the present invention preserves statistics for each golfer for long term analysis. Additionally, the apparatus of the present invention can also support infomercials from the golf course operators to entertain and educate the golfers while generating supplemental advertising revenues for the course operators.

15 Claims, 10 Drawing Sheets

COMPUTER AIDED GAME APPARATUS

BACKGROUND OF THE INVENTION

1. Field of the Invention

The invention relates to a computer-aided game apparatus, and more particularly, to an apparatus for providing information and for assisting a golfer during the progress of the game.

2. Description of the Related Art

As one of the fastest growing sports worldwide, the game of golf is played by using one or more clubs to drive a golf ball as close as possible to a pin. Although this process appears simple on the surface, the physics associated with the game of golf provide a good test of a person's coordination where physical strength must be coordinated with timing, touch, and strategy. Along with the physical skills involved with the correct driving of the ball, the game of golf involves the visual and mental estimation of the distance of the ball position to the green. For instance, the golfer needs to know the distance which the ball is to travel and the effect of existing conditions for which he or she must compensate to acquire the desired shot. Further, the golfer needs to skillfully select an appropriate club which is related the distance over which the ball is to be driven. The uncertainty as to the distance remaining to the green and the uncertainty as to how far the golfer normally hits the ball with a given club, coupled with other effects like wind, lies and rough, make the club selection process a challenging one. Variations in a golfer's swing, body alignment, grip, and tempo, when combined with wind, weather, trees, hills, sand and water, make golfing challenging both physically as well as mentally.

Because the mental judgments regarding the club selection, the swing, and other strategic considerations in playing golf are made from past experiences, rookie golfers typically select incorrect clubs for shots and/or make inappropriate swings, resulting in diminished results. In contrast, when professional golfers reach a tournament course, they carefully study the tees, greens and hazards to plan the game strategy. One of the key aspects is knowing yardage from various points on the course to the green, and yardage to various hazards, such as water, vegetation or sand traps. The yardage information enables the golfer to plan ball placement strategy and select the proper clubs for given distances. A knowledge of the distances, combined with prior experience, allows proper club selection and allows the golfer to formulate a hole management plan so as to result in victory.

In response to the above-mentioned challenges in playing golf, a number of devices have been developed to improve the golfer's game. Quite often, golf enthusiasts playing at a new course are unfamiliar with the course topography. To accommodate these golfers, course operators usually provide maps, typically as part of a score card, which illustrates the layout of the course and the respective hazards. The conventional score cards are usually pocket sized cards with a grid for keeping track of different golfers scores for each hole. Some score cards also have information concerning rules, etiquette, tee-to-green distance for each tee box available, par for the hole, and a graphical map for the course depicting the layout of each hole, including any obstacles and hazards in symbolic form.

The conventional score card typically also lists the yardage, par value, and the handicap for each hole in a golf course. Further, the score card also provides a place for the golfer to enter various statistics such as the number of strokes taken on a hole by each golfer in a group after the play of the hole has been completed. During the game, each golfer records on the score card the number of times required to hit a golf ball from one of the tee boxes into the cup on the putting green for each hole. After all of the holes in the course are completed, the golfer tallies the scores for each hole and records a total score for the course. Thus, the information recorded on such a score card consists of the total strokes required for each hole and for the entire course.

Although the course map provided in the score cards may indicate dog-legs, water hazards, bunkers, and areas out of bounds, these score cards are inconvenient to use in that, if the golfer is not at the tee or at the green, the score cards cannot tell him his current location and the remaining distance to the pin. To supplement the information provided in the score cards, the courses usually include distance markers placed at various locations along the course.

To further assist the user in measuring distances between golfers and landmarks on a golf course, a number of solutions have been developed. One solution uses books containing yardage calculations to determine the distance between the ball and a green or a hazard on the hole being played. Yardage books are more accurate than guessing the distance based on a visual inspection. However, one drawback to the use of yardage books is the fact that the book must be prepared prior to the round of golf. Further, this solution requires the golfer to consult maps and to make "on the spot" distance calculations, which at times can be difficult.

As discussed in U.S. Pat. No. 5,245,537, issued on Sep. 14, 1993 to Andrew T. Barber, a number of manual and automatic devices for assisting a golfer's performance on a golf course have been developed over the years. These devices generally include range finder type devices which are capable of measuring, with varying degrees of accuracy, the distance to a given object such as a pin. Some prior art devices rely on visually sighting the pin, while others require the pin to act as a receiver or a transmitter of location information. Additionally, other systems rely on developing a golf course coordinate system with linear accelerators to track a golfer's movement along the course. Yet other systems require the golf course to install tracking sensors below the fairway turf. Further, positional tracking devices may include mobile computers which contain digitized map representations of the playing field. These devices may include a global positioning system (GPS) receiver arranged to receive a global earth position information and a processing system for correlating the global earth position to the golfer's location and determine distances. However, these devices cannot provide in an integrated manner the ability to (1) accurately and continuously track the golfer's position anywhere on the golf course, including the golfer-to-pin or golfer-to-hazard distance; (2) keep a complete, long term recording of individual golfer performance accessible in a nationwide manner; (3) suggest an optimal club selection based on up to date measured distance and performance data, regardless of the golfer's proximity to his home city; (4) provide a system which minimizes the installation cost and while maximizing rental and advertising revenues for the golf course operators; and (5) provide user friendly, touch screen game tracking apparatus.

SUMMARY OF THE INVENTION

A computer aided game apparatus is disclosed for tracking location and distance on a golf course, recommending club selection, recording golfer performance statistics, receiving notification via a wireless transceiver, and playing infomercials during the course of a golf game. The apparatus has a processor connected to a memory which is suitably supports a geographic information system (GIS), a player performance database, and an infomercial database. The GIS contains reference coordinates for the holes and hazards on the golf course, while the player performance database stores past performance information for each golfer. The infomercial database provides useful tips to the golfers and recommends products sold by the course operator which improve the playing performance of the golfers. The apparatus has a global positioning receiver which operates in conjunction with the GIS for indicating the current position of the golfer. The GPS receiver is connected to the processor which in turn drives a convenient, intuitive touch screen display. The apparatus has a pager which allows for direct contact with the golfer. To support data networking, the microprocessor is also connected to one or more interface ports, including an infra-red port, a parallel port, a serial port, and a PCMCIA port.

Through the interface ports, the microprocessor can maintain, update, or back-up data stored in the memory. Typically, data not already present on the memory are downloaded from a central computer before each game is played. At the end of each game, statistics generated during the game are uploaded into the central computer system for archival purposes. As the game progresses, the apparatus of the present invention integrates the distance computation, the recording of the golfer performance, and the suggesting of proper club selection based on distance and past performance. Further, the apparatus of the present invention preserves statistics for each golfer for long term analysis. Additionally, the apparatus of the present invention can also support infomercials from the golf course operators to entertain and educate the golfers while generating supplemental advertising revenues for the course operators. These capabilities are integrated into a portable and easy to use computer-aided-game apparatus of the invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
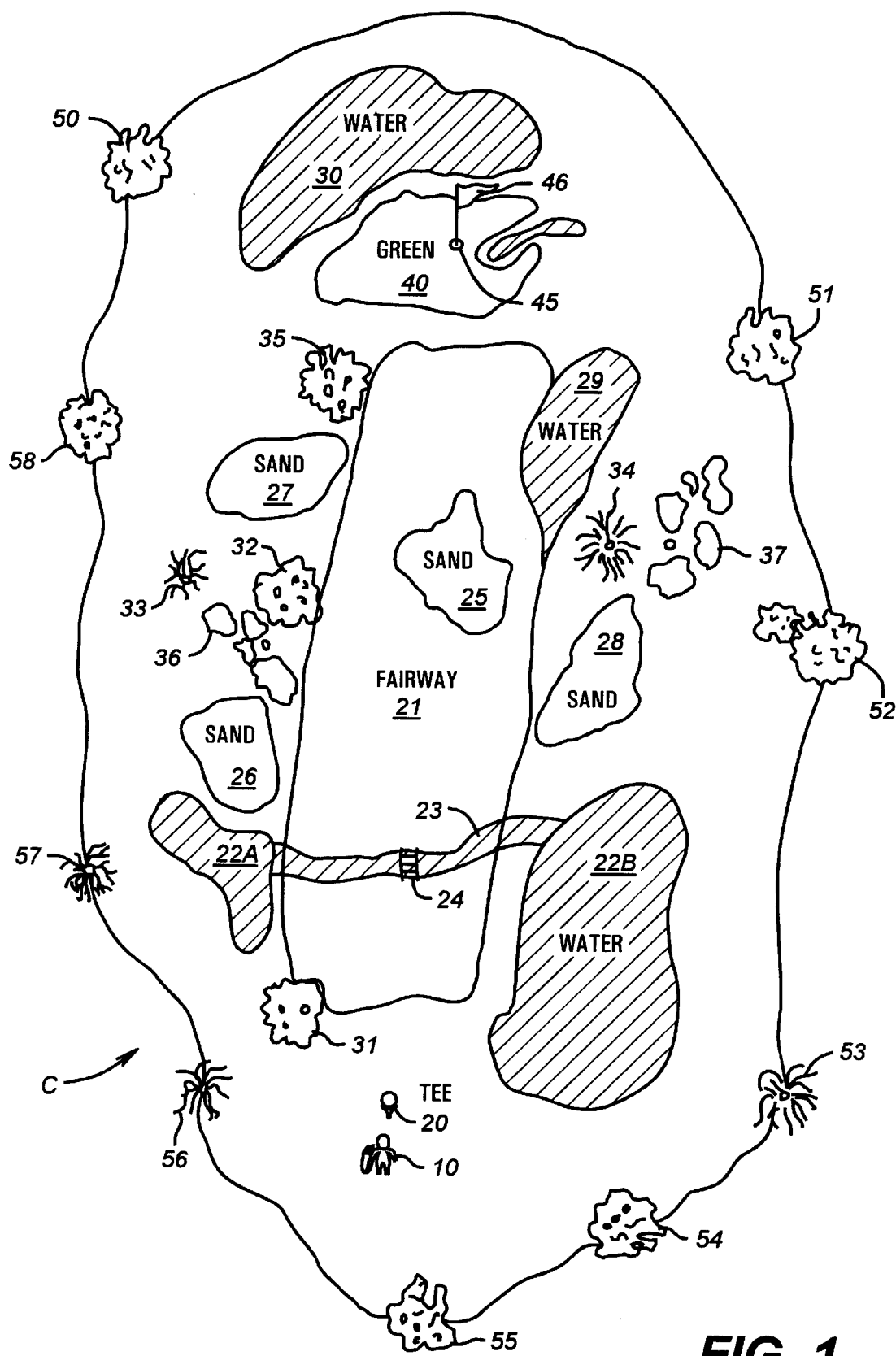
FIG. 1 is a plan view of an illustrative golf course where the apparatus of the present invention is to be deployed.

FIG. 1 is a plan view of an illustrative golf course providing the environmental background for a first embodiment of the present invention. The game is usually played on a 9 or 18 hole golf course with a variety of golf clubs for striking a golf ball different distances. Each hole of a golf course includes a tee box having a number of different tee markers, a fairway, rough, a putting green and a pin located in a cup on the putting green, among others. It may also include various hazards such as sand traps, water, bunkers, trees, etc.

In FIG. 1, a golf course C is provided to entertain a golfer 10. The perimeter of the golf course C has a plurality of plants and shrubs 50 through 58. The plants and shrubs 50 through 58 exist for landscaping purposes. They provide privacy for the players and also present potential hazards for an unlucky golfer, should he or she swing in the wrong direction. In FIG. 1, a golfer 10 begins his or her golf game at a tee box 20. After teeing off, the golfer 10 must traverse across a fairway 21 which is filled with obstacles, including a shrub 31. In FIG. 1, the fairway 21 has a creek 23 flowing between lakes 22A and 22B. After successfully hitting the golf ball across the creek 23, the golfer crosses the stream via a bridge 24. Once he crosses over the bridge 24, he faces a number of additional hazards, including the sand traps 25, 26, 27 and 28. After navigating through the sand traps, the golfer must also insure that he does not hit his ball into lakes 29 and 30. Additionally, a number of plants and shrubs 32, 33, 34 and 35 are provided as traps for the less fortunate golfer. Further, rock hills 36 and 37 present further challenges for the golfer 10. After the golfer 10 successfully navigates across the hazards, he finally reaches a green 40 containing a cup 45 with a pin 46 which highlights the ultimate goal of the game.

In the present invention, the plan view of the golf course is preferably a graphical representation of the golf course C as captured by a photograph obtained from a high resolution camera in a satellite orbiting over the course or from a plane flying over the course. This aerial representation is digitized and the resulting data may be stored as a bitmap file or compressed into a vector file using a suitable raster to vector converter. The resulting data is stored in a GIS database known to those skilled in the art. The mapping of the location of the golfer into the actual spot on the golf course using a stylus or using a GPS receiver will be discussed below.

Figure 2:
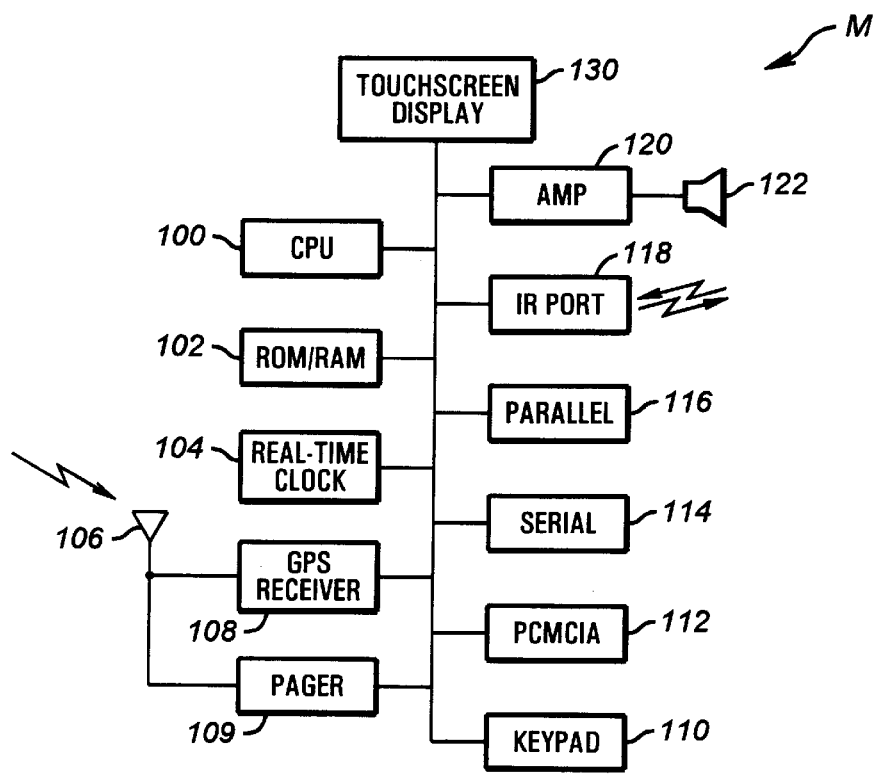
FIG. 2 is a block diagram of the computer aided game apparatus of the present invention.

Turning now to FIG. 2, the mobile microcomputer aspect of the present invention is shown. In FIG. 2, a microprocessor, or central processing unit (CPU) 100 is provided to process golf game data. The CPU 100 is preferably a single chip microcomputer with on-chip peripherals. While CPU 100 is a complex instruction set computer (CISC) chip, the invention contemplates that the CPU 100 can be one of the commercially available reduced instruction set computer (RISC) chips which are known to be of generally higher performance than CISC chips.

The CPU 100 is connected via a bus 101 to a read only memory/random access memory (ROM/RAM) 102. The ROM portion of the ROM/RAM combination 102 preferably contains the basic operating system as well as the geographical information system (GIS) and the database application software for the apparatus of the present invention, while the RAM portion of the combination 102 is utilized as a scratch-pad memory. Preferably, the ROM/RAM combination 102 is of sufficient capacity to store the data associated with the GIS and the databases. The CPU 100 is also connected to a clock 104 which is preferably a real-time clock for providing time information to the apparatus. Alternatively, the clock 104 can simply provide a regular clock pulses to, for example, an interrupt port of the CPU 100 which can count the clock pulses to provide a time function.

To receive positioning information, the CPU 100 is connected to a global positioning system (GPS) receiver 108 which preferably operates with the NAVSTAR (Navigation Satellite Timing and Ranging) or the Iridium system. The GPS receiver 108 is connected to an antennae 106. The GPS is an absolute positioning system capable of providing accurate three dimensional position information. The GPS satellite constellation comprises 24 satellites distributed throughout six orbital planes equally spaced around the equator and inclined at an angle of 55°. The satellites orbit in an approximate altitude of 11,000 nautical miles and have an orbital period of 12 sidereal hours such that signals from at least 4 GPS satellites can be received at any point on or above the earth's surface at any point in time.

The GPS receivers determine position by simultaneously receiving signals from at least four satellites. The satellites signals contain information on each satellites instantaneous position. Further, the satellite transmitters modulation scheme uses a pseudo random code. This code provides a time stamp that is synchronized with an atomic time clock at the satellite master control station in Colorado Springs, Colo. By measuring the difference between the internal clock and the time stamp imbedded in the satellite signal, GPS receivers can calculate their distance from the satellite. The receivers combine this distance with the satellite position information to calculate a spherical surface representing the receivers possible locations. Using information from four satellite simultaneously, the receivers can reduce the location possibilities to a single point in three space and eliminate any error in the receivers internal clock.

Although the preferred embodiment uses a single GPS receiver which is capable of determining absolute positioning in terms of latitudinal, longitudinal and attitudinal coordinates, when extreme accurate distance information is required, systems utilizing GPS technology to provide highly accurate differential positioning can be utilized to determine the relative position between the receivers in real time. This method is much more accurate than the absolute positional sensing since the errors associated with the absolute position are substantially cancelled when one absolute position is subtracted from a second absolute position, provided that the measured distances is small compared to the distances between the receivers and the satellites.

The CPU 100 is also connected to a pager unit 109 which receives radio signals coming from the antenna 106. The pager 109 allows messages to be transmitted to the golfer when he or she is playing on the course and not easily accessible. When messages are transmitted to the pager unit 109 via the paging service providers, the CPU 100 is interrupted and displays one or more messages to the golfer. In this manner, the computer aided game apparatus allows the golfer to enjoy golf and yet still be accessible in emergencies. To provide audible feedbacks to the golfer, the CPU 100 is connected to an audio amplifier 120, which is in turn connected to a speaker 122.

Additionally, the CPU 100 is connected to a keypad 110 for receiving predetermined user inputs. For communications to and from other computer systems, the CPU 100 is connected to a plurality of input/output (I/O) ports, including a PCMCIA port 112, a serial port 114, a parallel port 116, and an infrared port 118.

The PCMCIA port 112 provides a relatively high speed bus for adding peripherals, including mass storage devices or a non-volatile memory module of sufficient capacity to store a GIS or databases. However, the mass storage device can be eliminated by providing a sufficient amount of RAM in the ROM/RAM combination 102 to store the user application programs and data. In that case, the RAM portion can be provided with a backup battery to prevent the loss of data even when the apparatus of the present invention is turned off. Alternatively, the RAM portion of the ROM/RAM combination 102 can be a non-volatile flash electrically erasable ROM (flash ROM) such that the backup battery is not needed. In addition to being able to accept data storage devices, the PCMCIA port 112 can also accept a PCMCIA-based GPS receiver or pager, in the event that the GPS receiver 108 and the pager 109 is not bundled with the computer aided game apparatus to reduce cost.

The serial port 114 and parallel port 116 can be used to connect the CPU 100 to external devices, as is conventional. Similar to the serial and parallel ports 114 and 116, the infrared port 118 can be used for outgoing information or for incoming information from other computers or devices. The use of the infra-red port 28 prevents the hassles associated with connecting wires to the serial or parallel port. The infrared port 118 preferably conforms to the IRDA standard. The IRDA specifications provide guidelines for link access, link management and for the physical transfer of data bits. The link access mechanism provides guidelines for the software which looks for other machines to connect or to sniff, to discover other machines, to resolve addressing conflicts, and to initiate a connection, to transfer data, and to cleanly disconnect. The link access standard specifies a frame and byte structure of the infrared packets as well as the error detection methodology for the infrared communication. The IRDA specifications for operating distance, viewing angle, optical power, data read, and noise immunity enable physical interconnectivity between various brands and type of equipment, such as the personal computer 150 and mobile unit 140.

The storage capacity provided by either the ROM/RAM combination 102 and/or the PCMCIA solid state mass storage device discussed above is used to support the mapping information in the GIS and the entertainment/educational information in the infomercial database. At the most basic level, the GIS database includes all major golf course features and landmarks and other critical features such as the pin and the hazards with their geographic coordinates. The geographic tags on the features and landmarks allow the apparatus of the present invention to quickly map the GPS receivers position indication to the Cartesian (i.e., X and Y) coordinates of the location and display them on a touchscreen display 130. The placement of the GIS on a removable module such as a PCMCIA data storage device has an advantage in that the golfer can simply record statistics on his or her own data storage device which could be simply removed at the end of the game and plugged into the new computer aided game apparatus during the next game, regardless of whether the golfer is playing at his or her usual golf course or another golf course, as long as the golf courses operate a compatible golf game database management system.

The use of the touch screen display 130 allows the golfer to enter data in a quick and convenient manner, in contrast to keyboard-only systems. The touchscreen display assembly 130 of the computer aided game apparatus is both an input and an output device. When operating as an output device, the touchscreen display assembly 130 receives data from the processor 100 via the bus 101 and displays the data on a suitable screen. The screen for the display assembly 130 is preferably a liquid crystal display (LCD) of the type commercially available from a variety of vendors such as the displays available from Scriptell Corporation of Columbus, Ohio. The input device of the touchscreen display assembly 130 is preferably a thin, clear membrane which covers the LCD display and which is sensitive to the position of a pointer 138 on its surface. The pointer 138 could be a stylus such as the tip of a pen, a golf tee, a golf club or a human finger. With such a structure, the membrane of the touchscreen display assembly 130 can serve as an input "tablet." Commercially available combination display assemblies such as the aforementioned assemblies are available from Scriptel Corporation, Sharp, and others.

The membrane touch screen system is manufactured using an indium-tin-oxide (ITO) compound which is spattered onto LCD protective glass to form a transparent, resistant coating with a linear voltage drop across it. A second, conducted ITO layer covers the under side of a mylar membrane. The two ITO layers are sandwiched together, separated only by microsphere spaces or ink dots. When a stylus or finger presses the mylar ITO coating, which acts as a flexible contact against the resistive layer, a voltage is picked up which varies with their position of the contact point. To protect the soft mylar surface of membrane systems against damage by moisture, dirt, scratching, and exposure to the environment, the apparatus has a thin, weather-proofing encapsulation to cover the electronics.

Although membrane technology is utilized in the preferred embodiment, resistive technology could be utilized as well. In resistive touch screen technology, a metal tip stylus connected by a conductive wire to a system and a glass surface coated on top with a slightly resistive conductive material, such as ITO, is provided. A linear voltage drop is applied to the ITO surface oscillating between the X and Y dimensions. The metal tip stylus, in contact with the surface, acts as a probe reading the voltage wherever it touches. The voltage is proportional to the stylus position on the surface. Alternatively, a number of technologies are available which offer digital pen and finger touch technologies: active pen electromagnetic, passive pen electromagnetic, corded electrostatic and cordless electrostatic and that the present invention contemplates that these input technologies are interchangeable.

During operation, information is input into the computer aided game apparatus by depressing the appropriate areas on the screen of the display assembly 130. Information concerning the location of the depression on the screen of the display assembly 130 is input into the CPU 100. Typically, the display assembly 130 converts the human input into Cartesian coordinates of a pixel of the screen of the display assembly 130 according to the position of the depression. The CPU 100 then processes the data under the control of the operating system software and applications stored in the ROM/RAM combination device 102 or the mass storage device or solid state memory module plugged into the PCMCIA port 112. The CPU 100 then produces data which is transferred to the display assembly 130 to produce the appropriate images on the screen portion of the display assembly 130.

Figure 2A:
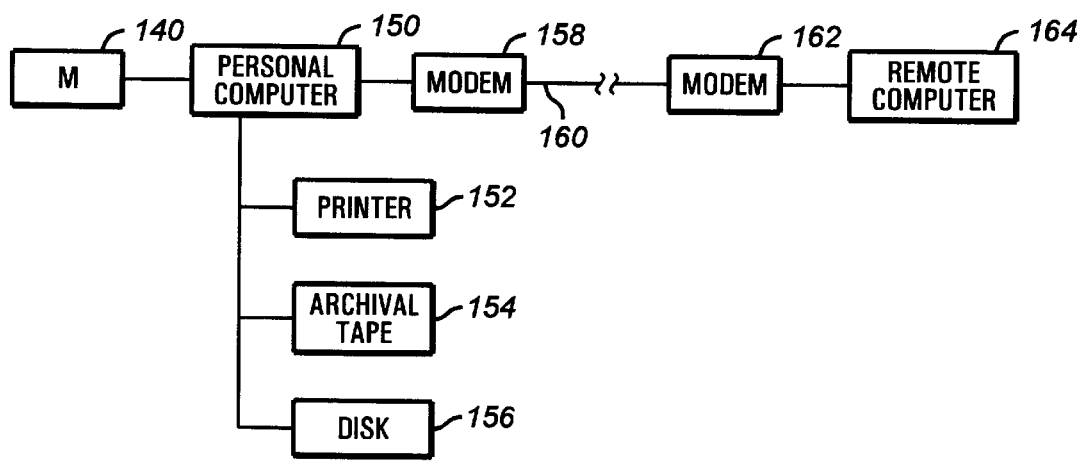
FIG. 2A is a block diagram of a host computer which is adapted to support the apparatus of FIG. 2.

Turning now to FIG. 2A, the host computer system supporting the computer aided game apparatus of the present invention is disclosed. In FIG. 2A, the apparatus 140 is docked to a personal computer 150 via a number of different options, including the PCMCIA port 112, the serial port 114 and the parallel port 116. The apparatus 140 and the computer 150 can also be docked optically via the infrared port 118. The personal computer 150 is preferably a high performance microcomputer such as a Pentium® based IBM compatible personal computer system or a Power PC® based Macintosh personal computer.

The personal computer 150 is also connected to a high quality printer 152, and archival tape backup tape 154, and a hard drive 156 for large capacity data storage. Further, the personal computer 150 is connected to a modem 158 for communication over a wide line 160. At the other end of the telephone line 160, a modem 162 is connected to the telephone line 160 at one end and at the other end connected to a remote computer 164. The modem devices 158 and 162 and the line 160 are part of a wide area network where, in the event the local personal computer 150 does not store one or more parameters requested by the apparatus 140, the personal computer 150 can access the remote computer 164 over the telephone line 160 using modems 158 and 162. Such accessibility allows the golfer to download his or her game statistics, regardless of the golf player's home.

Figure 3:
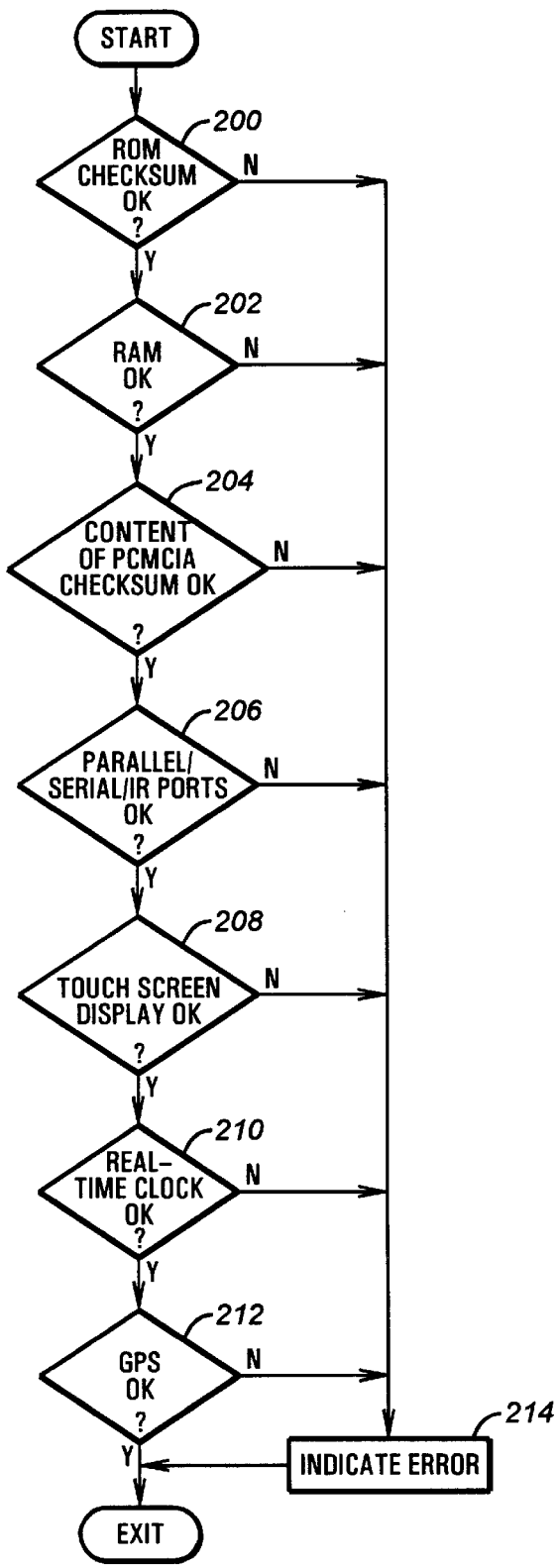
FIG. 3 is a flow chart of the power-on-self-test process to be executed by the apparatus of FIG. 2.

Turning now to FIG. 3, a routine to perform the power-on self test function, as stored in the ROM portion of the combination of the ROM/RAM 102, is disclosed. From step 200, the routine checks to see if the ROM in the ROM/RAM combination 102 good. If the CHECKSUM of the ROM 102 is good, the routine proceeds to do a memory check on the RAM portion of the ROM/RAM 102 combination in step 202. Next, if the RAM is good in step 202, the routine checks the content of the data storage device, if one is plugged in the PCMCIA port 112, in step 204 by running a checksum on the data stored therein. If the checksum test on the PCMCIA-based storage device is good, the routine checks the functionality of the parallel/serial and infrared ports in step 206. The system also checks the touchscreen functionality in step 208 before it checks the real time clock in step 210. The routine of FIG. 3 also performs a functional check of the global positioning system in step 212. If the ROM fails the checksum process in step 200, or if the RAM memory was defective in step 202, or if the content of the PCMCIA data storage card is corrupted, or if the parallel, serial or infrared ports fail, or if the touch screen fails in steps 208, or the real time clock fail in step 210, or the GPS device fails in step 212, the routine proceeds to step 214 where an error is indicated before the system gracefully shuts-down. The computer aided game apparatus thus ensures its integrity before allowing the golfer to record information, thereby preventing possible data corruptions.

Figure 4:
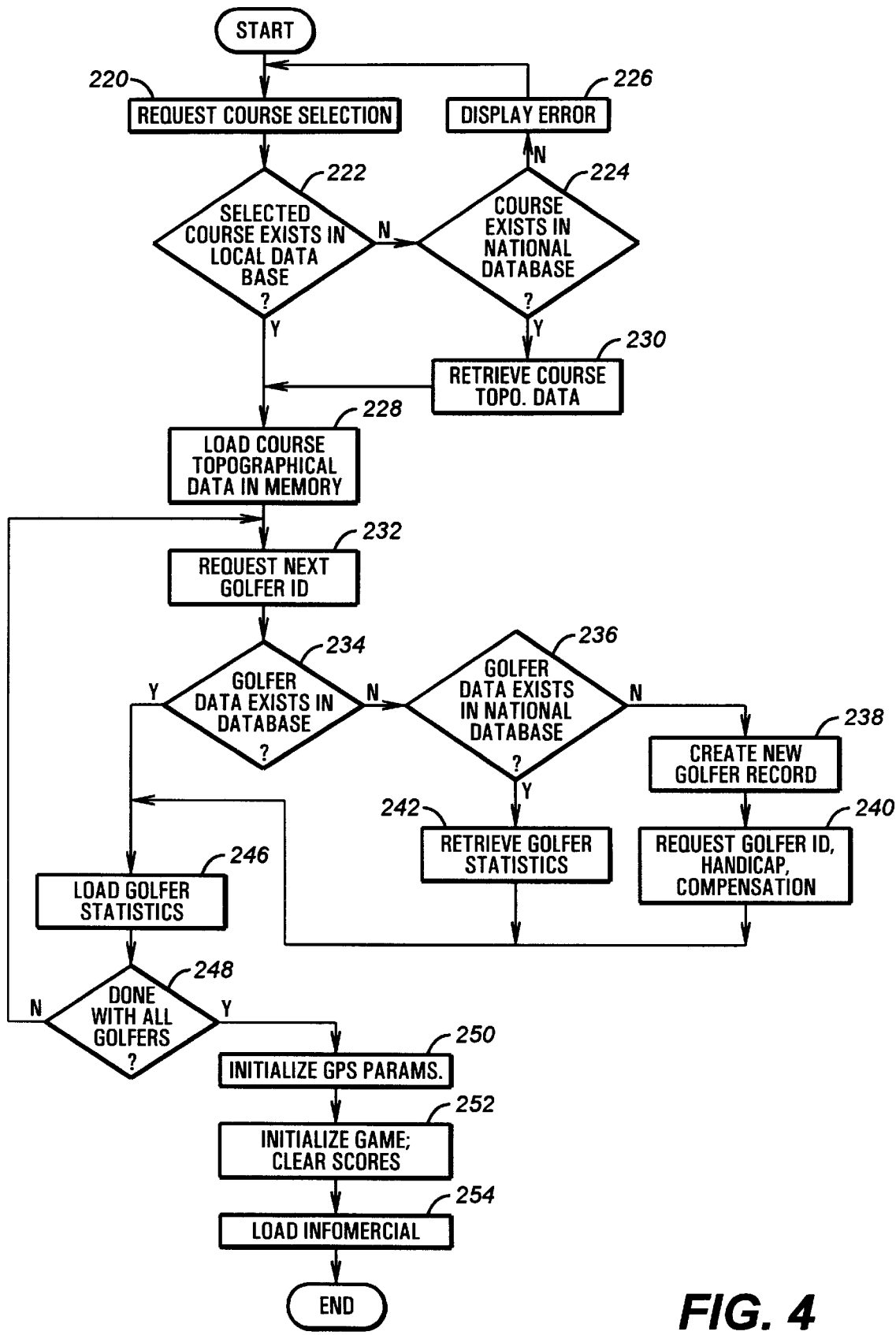
FIG. 4 is a flow chart of the initiation process for the apparatus of FIG. 2.

Turning now to FIG. 4, the initialization process for using the golf game tracking device of the present invention is disclosed. Upon checking into the golf course, the user powers up the apparatus. After performing the power-on self test, the system requests the course selection to be made in step 220. After the course selection has been entered by the user, the system checks to see if the selected course exists in the local database in step 222. In the event the course does not exist in the local database, the system then checks into a national database to see if the course exists there in step 224. If the selected course exists neither in the local database or in the national database, an error message is displayed in step 226 and the routine loops back to step 220 to request the user enter a proper course. From step 222, if the selected course exists in the local database, the routine loads the course topographical data into the memory 102 of the golf game tracking device. Also, from step 224, if a course exists in the national database, the data is retrieved in step 230 and loaded into the memory 102. From step 228, the routine requests the next golfer identification in step 232. From step 232, the golfer identification is checked and if the golfer data exists in the database in step 234, the statistics for the golfer are loaded into the memory 102 in step 246. Alternatively, if the golfer is not in the database already, the routine checks to see if the data for the golfer exists in the national database in step 236. If so, the routine retrieves the golfer's statistics from the national database in step 242 and loads the golfer's statistics into memory 102 in step 246. Alternatively, from step 236, the routine creates a new golfer record in step 238 and requests the golfer to enter a new identification and various personal statistics such as handicap, and club compensation in step 240. From step 234, 242, or 240, the current golfer data is stored in the memory 102 of the apparatus of the present invention in step 246. In step 248, the routine checks to see if statistics for all golfers have been entered. If not, the routine loops back to step 232 to request the next golfer identification. Alternatively, from step 248, if statistics for all golfers for this particular game have been entered, the routine then initializes the global positioning system parameters in step 250, if the global positioning system has been installed as a resource through the apparatus of the present invention. Next, in step 252, the system initializes the game by clearing the scores and the various data structures. Next, in step 254, in the event that the golf course operator wishes to use the ability of the present invention to broadcast commercials, the commercial is loaded into the memory 102 of the apparatus in step 254. At this stage, the apparatus of the present invention is properly initialized and statistics particular to each golfer is properly downloaded into the memory 102.

Figure 5:
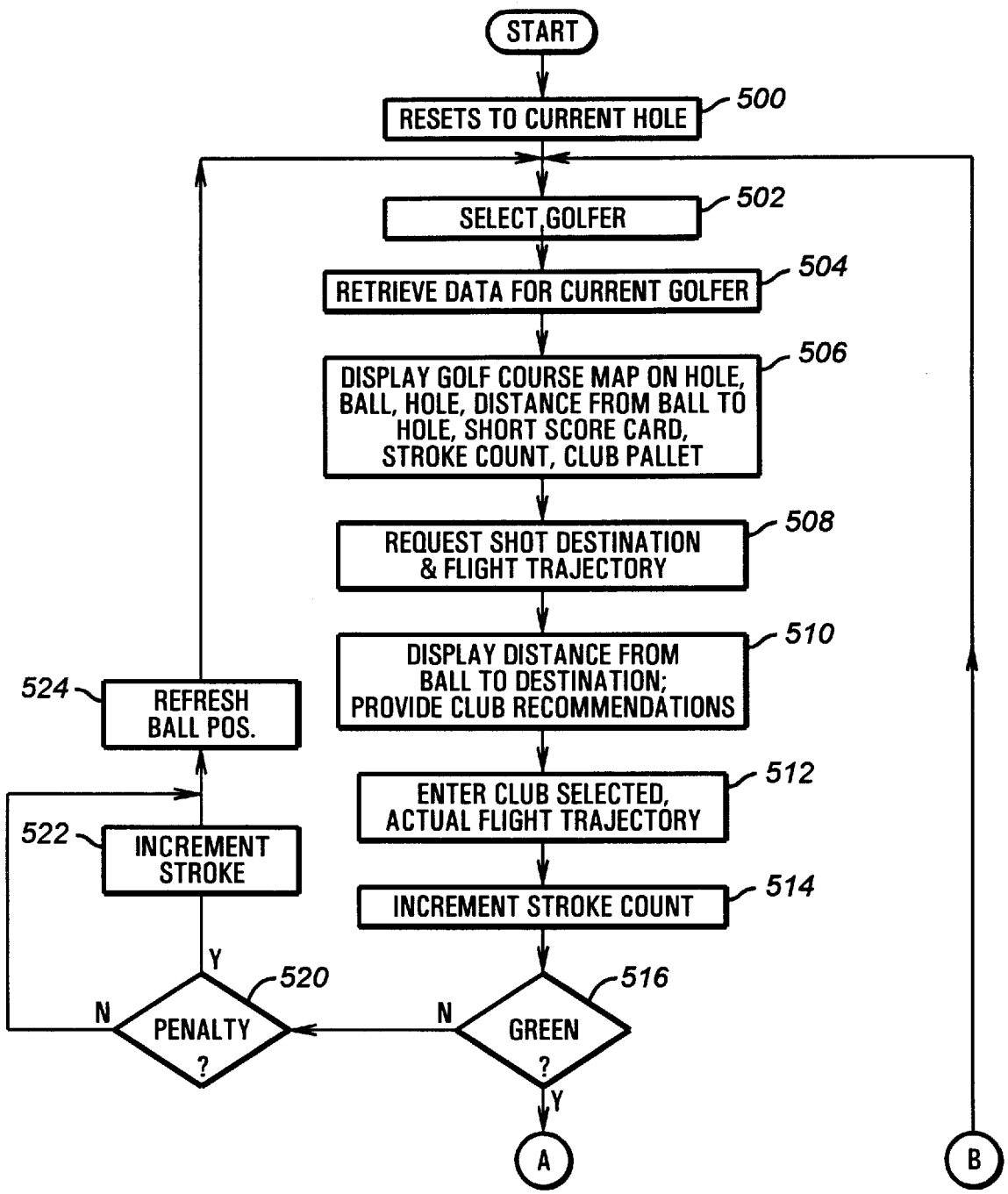
FIGS. 5 and 5A are flow charts of the process for tracking location and distance on a golf course, recommending club selection, recording golfer performance statistics, and playing infomercials during the course of a golf game using the apparatus of FIG. 2.
Figure 5A:
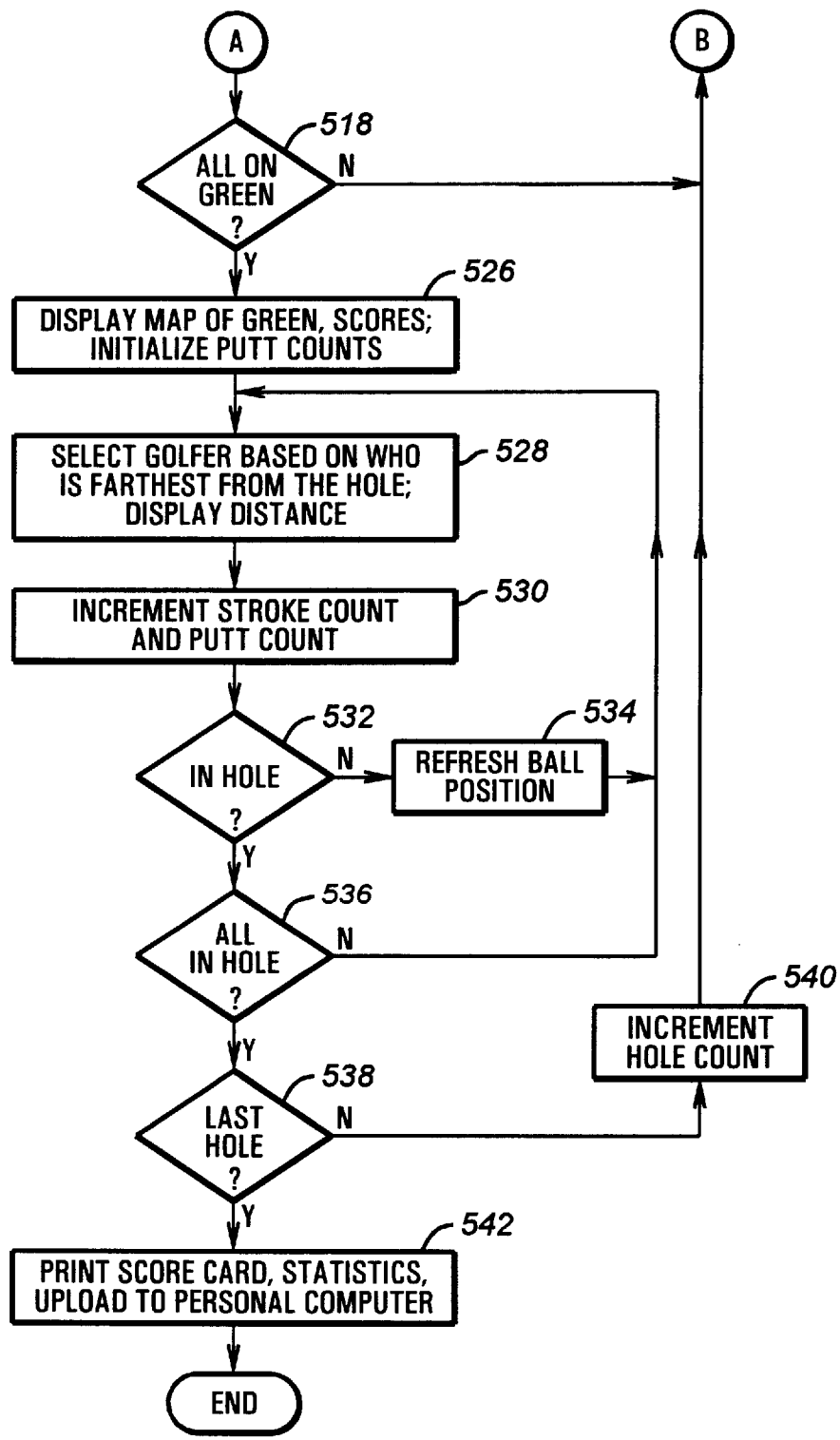

Turning now to FIGS. 5 and 5A, the operation of the apparatus of the present invention on the golf course is disclosed. In step 500, before the game is started, the routine resets the current hole statistics to the starting hole. Next, in step 502, the user selects the golfer as the current golfer. Next in step 504, the routine retrieves data for the current golfer from the memory 102. From step 504, the routine displays the golf course hole map on the touch screen display 130. The touch screen display 130 also shows the ball position, the target hole, the distance from ball to hole, a short score card, a stroke count, a club pallet for displaying the choices available to the golfer. In steps 508, the user enters the shot destination and selects the desired ball flight trajectory. In step 510, the routine displays the distance from the ball to shot destination and a club recommendation based on this distance, the golfer's past statistics, and other factors which may be entered externally such as the wind condition, among others. From step 510, the user selects a club and, after the shot, enters the actual ball flight trajectory. In step 514, the routine increments the ball stroke count. Next, in step 516, the routine checks to see if the current ball position is on the green or not. If not, the routine checks to see if the ball has entered a penalty area in step 520. If yes, the routine increments the ball stroke count before continuing to step 524. If no, in step 524, the ball position is refreshed. Next the routine loops back to step 502. From step 516, if the golfer is on the green, the routine checks to see if all golfers are on the green in step 518 (FIG. 5A). If no, the routine loops back to step 502. If yes, in step 526, the routine displays the map of the green, the ball position, the hole, and the short score card, then initializes the putt count. Then in step 528, the routine selects the next golfer based on who is farthest from the hole and displays this distance. The putt count is incremented in step 530. In step 532, the routine checks to see if the ball is in the hole. If not, the ball position is refreshed in step 534 before the routine loops back to step 528. If yes, the routine checks to see if all golfers are in the hole in step 536. If no, the routine loops back to step 528. If yes, the routine checks to see if this hole is the final hole in step 538. If no, the hole count is incremented in step 540 and the routine loops back to step 502. If yes, the routine prints the score cards, the shot and statistics, and uploads the data into the local database when the apparatus of the present invention is docked with the personal computer of the club house in step 290. The thus disclosed apparatus allows golfers to conveniently and easily record and display scores of one or more golfers and record and display the number of strokes as well as putts taken on each hole, the yardage obtained on each stroke, and the like. Further, accumulated information is stored in the device and can be uploaded into a computer for archival purposes. The archived data may be subsequently utilized to evaluate the skill of the golfer to provide further help in the selection of a club for a particular shot, or for further improvements in golf techniques. In the event that the infomercial option is enabled by the golf course operator, the routine can display in the background various commercials or infomercials or alternatively, improvement techniques which can be provided as a background for the golfer's enjoyment.

Figure 6:
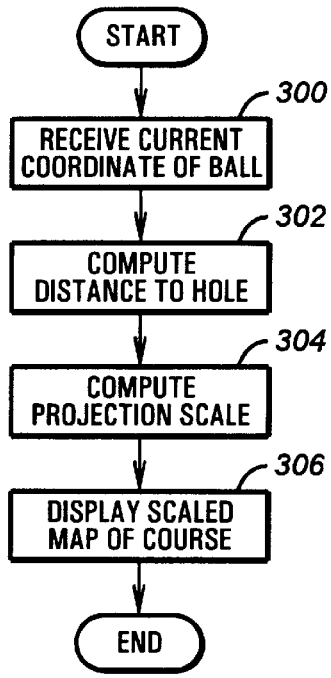
FIG. 6 is a flow chart of the process for displaying a scaled or zoomed portion of the course by the apparatus of FIG. 2.

Turning now to FIG. 6, the routine to display the map of the course hole or the green is disclosed. In step 300, the routine receives the current coordinate of the ball. In the embodiment with the global positioning system, the CPU 100 queries the GPS receiver 108 for longitudinal, latitudinal, and attitudinal coordinates of the apparatus of the present invention. Although the current coordinates of the apparatus are not the precise coordinates of the ball, the position of the apparatus of the present invention is a very close approximate to that of the ball. To further improve the accuracy of the ball position, the user may enter then offsets in step 300 to adjust for the difference between the position of the apparatus and the ball. In the event that a global positioning system is not available, the user can indicate the current coordinate of the ball using the touch screen. In this event, the user can scroll around the map of the golf course hole and zoom in as appropriate to indicate the precise location of the ball by depressing the appropriate area on the screen. Next, in step 302, the routine retrieves the coordinates of the hole from the data in memory 102. Further, in step 302, the difference in position between the hole and ball is computed. Next, in step 304, the routine computes the projection scale so that the map could be zoomed up appropriately to show a close-up view of the relevant portion of the map addressing the ball and the hole. Next, in step 306, the routine applies a projection scale to display the scale map of the course. In this manner, the present invention can zoom in on the appropriate map of the golf course so that the golfer can have a better indication of his playing environment.

Figure 7:
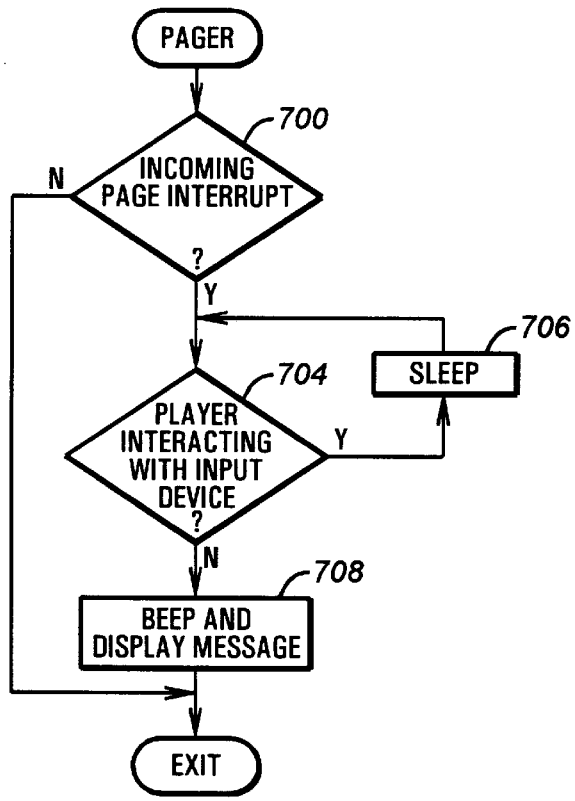
FIG. 7 is a flow chart of the process of paging a golfer by the apparatus of FIG. 2.

Turning now to FIG. 7, the routine to alert the golfer of an incoming page is disclosed. From step 700, the routine checks to see if an Incoming Page interrupt has been received. If not, the routine continues without notifying the golfer. If an Incoming Page interrupt has been received, the routine in step 704 checks to see if the golfer is interacting with the input device. If the golfer is interacting with the input device, the routine, in step 706, enters a temporary sleep mode. Then the routine loops back to step 704 to again check on golfer interaction. If the golfer is not interacting with the input device, the routine proceeds to step 708 where the golfer is notified of the message using a number of techniques known to those skilled in the art. The golfer is notified of an incoming message using a number of means such as beeping, vibrating, or flashing a symbol on the display.

Figure 8:
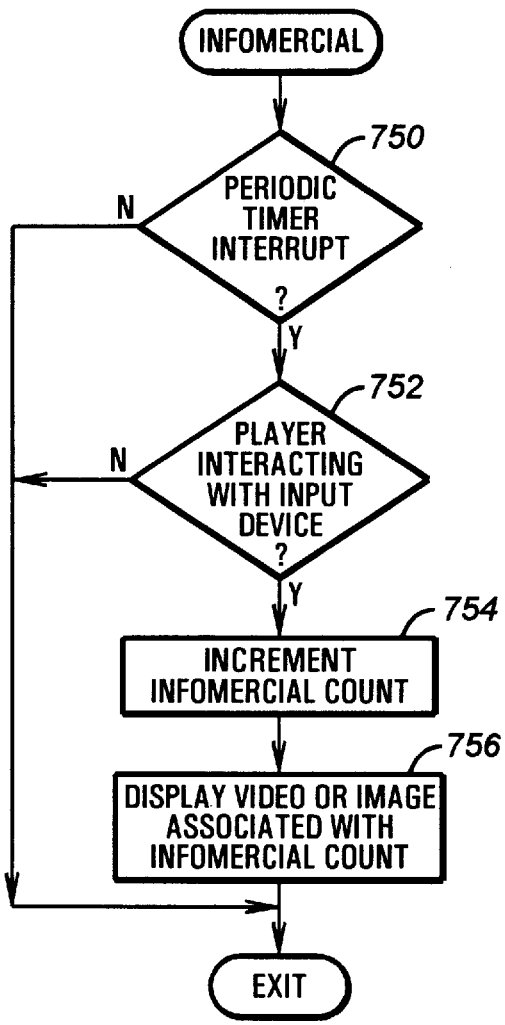
FIG. 8 is a flow chart of the process of displaying an Infomercial on the apparatus of FIG. 2.

Turning now to FIG. 8, the routine for displaying an infomercial is disclosed. In FIG. 8, from step 750, the routine checks to see if a Periodic Timer interrupt has been received. If not, the routine continues without displaying the infomercial. If a Periodic Timer interrupt has been received, the routine in step 752 checks to see if the golfer is interacting with the input device. If the golfer is interacting with the input device, the routine will continue without displaying the infomercial. If the golfer is not interacting with the input device, the routine in step 754 increments the infomercial count and in step 756 displays the Infomercial in forms known to those skilled in the art. The form of the infomercial includes a video presentation, display of an image, or an audio presentation.

Figure 9:
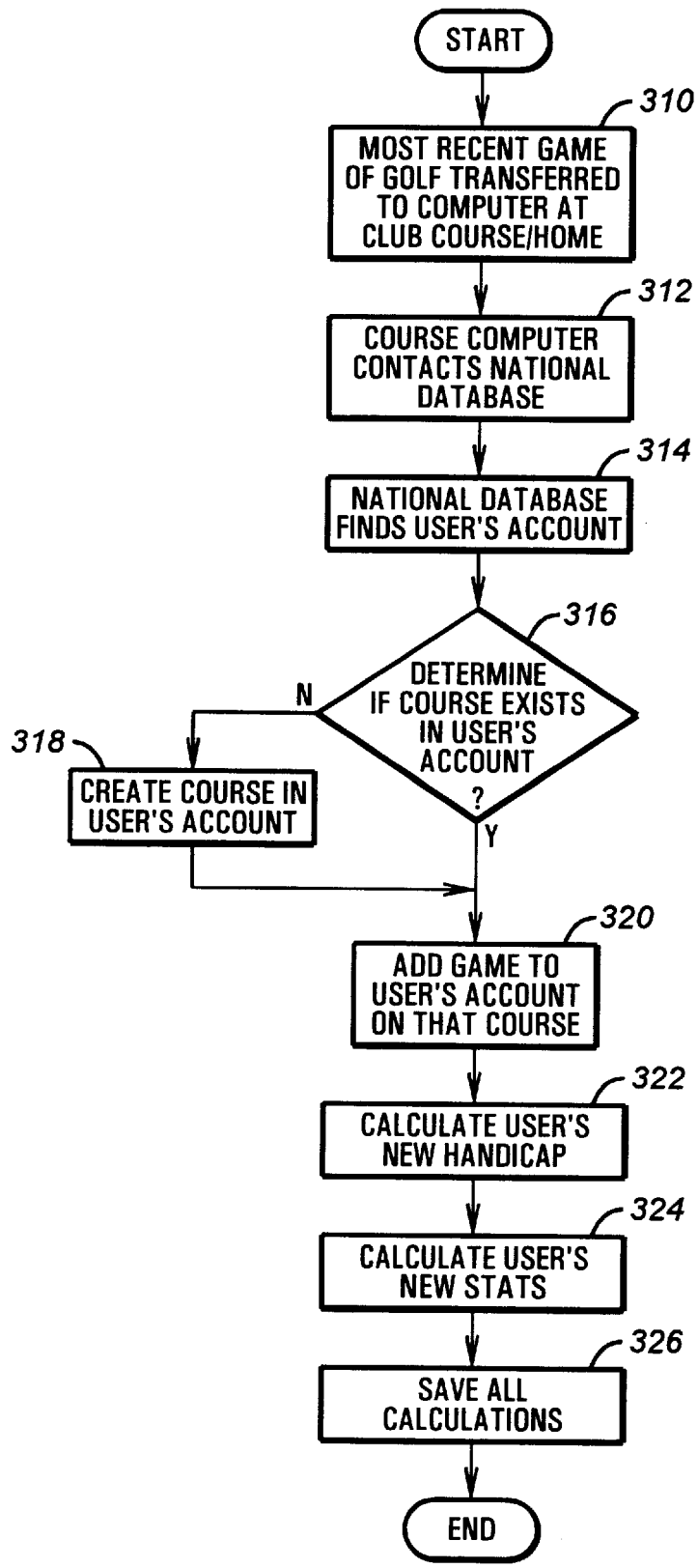
FIG. 9 is a flow chart of the process for transferring statistical information from the apparatus of FIG. 2 to the host computer of FIG. 2A.

Turning now to FIG. 9, the routine to update the national database is disclosed. Upon the completion of a round of golf, the golfer returns the mobile apparatus M to the club house. At the club house, the information collected by the mobile apparatus M concerning the particulars of the round just completed are uploaded to the local golf club database system located on the personal computer 150. Next, the local golf course computer contacts the national database in step 312 using a number of techniques known to those skilled in the art. The local computer may communicate with the national computer using a number of means such as the Internet or over the telephone system using a modem. Next, in step 314, after the local computer has logged in to the national database, the golfer's accounts are uploaded into the national database in step 314. Upon receipt of the user's accounts and statistics associated with the user, the national computer determines whether or not the golf course that the user has recently played on exists in the user's account in step 316. If not, data about the course is created in the user's accounts in step 318. From step 316 or 318, the national computer adds statistics generated during the game to the user's account on that particular course in step 320. Next, the user's new handicap is generated in step 322 and the user's statistics are generated in step 324. These statistics and computations are saved in step 326 before the national computer is completed with the national upload process. At this stage, statistics regarding a golfer's performance is stored in a national database which is available regardless of a golfer's presence at his home base or not. The golfer can download the most recent statistics the next time he plays a round of golf.

Figure 10:
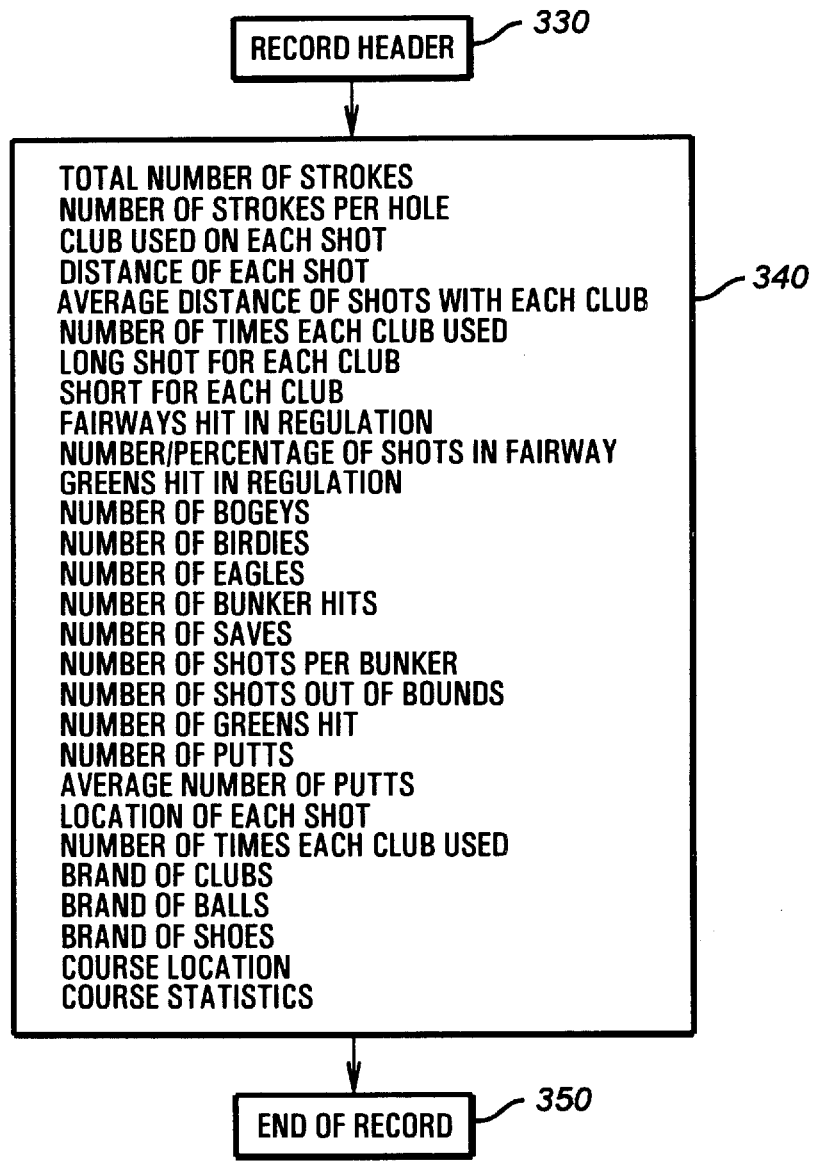
FIG. 10 is a diagram of a database record of fields associated with the player performance statistics database supported by the apparatus of FIG. 2 and the host computer of FIG. 2A.

Turning now to FIG. 10, a representative data structure for the statistics saved for each game for each golfer is shown. During the game, the data structure is temporarily stored in the ROM/RAM memory 102 for each golfer. At the end of the game, this data structure is transmitted from the mobile apparatus M into the personal computer 150 over a plurality of media, including the infrared port 118, the parallel port 116, the serial port 114, or the PCMCIA port 112.

The data structure of FIG. 10 includes a record header 330 which includes certain basic information about the record such as the length, the type of data, the type of encoding, among others. The header 330 is connected a data structure 340, which can include a number of elements, or fields. As shown in FIG. 10, a list of representative elements or fields include: total number of strokes, number of strokes per hole, club used on each shot, distance of each shot, average distance of shots with each club, number of times each club used, long shot for each club, short for each club, fairways hit in regulation, number and percentage of shots in fairway, greens hit in regulation, number of bunkers hit, number of bogeys, number of birdies, number of eagles, number of bunkers hit, numbers of saves, number of shots per bunker, number of shots out of bounds, number of greenies, number of putts, average number of putts, location of each shot, number of times each club used, brand of clubs, brand of balls, brand of shoes, course location, course statistics. At the end of the data structure, an end of record indicator 350 is provided which signifies that this is the last element of the current data record. The next record would have another header, a series of elements or fields, and another end of record marker or indicator. Thus, because the data structure storing the game statistics are pre-defined, the data captured in each golfer's game can be easily transported from the mobile apparatus to the local personal computer 150 at the golf course and ultimately to the remote computer 164 which stores data for all golfers on a national basis.

While the golf club statistics and selection device of the present invention has been disclosed in connection with golf courses only, it should be appreciated that the movement measuring advantages of the device can be used in any system were the coordinates of relevant objects have been predetermined. That is, the device could easily be used for private hunting reserves to determine distances to shelters, food, cash, etc. Further, the apparatus of the present invention can be used in conjunction with other sports such as skiing, bicycling, among other sports which cover a relatively large area.

Additional benefits and advantages of the present invention will become apparent to those skilled in the art to which this invention relates. Thus, while the golf club statistics and selection device of the present invention has been disclosed in connection with golf courses only, it should be appreciated that the movement measuring advantages of the device can be used in any system were the coordinates of relevant objects have been predetermined. That is, the device could easily be used for private hunting reserves to determine distances to shelters, food, cash, etc. Further, the apparatus of the present invention can be used in conjunction with other sports such as skiing, bicycling, among other sports which cover a relatively large area.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A system for playing a game on a course, said game having one or more players, said system comprising:
 a portable apparatus, comprising:
  a processor;
  a memory coupled to said processor;
  a display coupled to said processor;
  a data input device coupled to said processor;
  a geographic information system (GIS) stored in said memory, said GIS representing said course as an electronic map;
  a position locator stored in said memory and coupled to said GIS to indicate the position of the player on said electronic map;
  a performance database stored in said memory and coupled to said position locator for capturing statistical information from the player and generating recommendations to the player based on said statistical information to optimize the player's result; and a communication port coupled to the processor for sending and receiving the GIS and the performance database to and from the portable apparatus;

a host computer for use at a golf course with the portable apparatus, the host computer comprising:
 a second communication port to link the host computer to the portable apparatus; and a national computer system adapted to communicate with the host computer:
 a national GIS residing on said national computer system; and
 a national performance database residing on said national computer system, wherein said GIS of said apparatus and said database of said apparatus are adapted to be downloaded via the host computer from said national GIS and said national performance database of the national computer.

2. The apparatus of claim 1, wherein said input device is touch-sensitive.

3. The apparatus of claim 1, wherein said course has one or more landmarks and wherein said GIS stores coordinates of said landmarks in said electronic map.

4. The apparatus of claim 3, wherein said coordinate data includes latitudinal, longitudinal and attitudinal coordinates.

5. The apparatus of claim 1, wherein said GIS contains a plurality of electronic maps representative of a plurality of courses, further comprising a menu for selecting one of said plurality of electronic maps as a playing course.

6. The portable golf game tracking device of claim 1, further comprising a global positioning system (GPS) coupled to said processor and to said position locator to provide positional information.

7. The apparatus of claim 1, where in said performance database captures data records, wherein each of said data record includes one or more fields selected from a performance statistics set, including: a total number of strokes, a number of strokes per hole, clubs used on each shot, a distance of each shot, an average distance of shots with each club, a number of times each club is used, a long shot for each club, a short shot for each club, fairways hit in regulation, a number and percentage of shots in fairway, greens hit in regulation, a number of bunkers hit, a number of bogeys, a number of birdies, a number of eagles, a number of saves, a number of shots per bunker, a number of shots out of bounds, a number of greens hit, a number of putts, an average number of putts, a location of each shot, a number of times each club used, brand of clubs, brand of balls, brand of shoes, course location, and a course statistics field.

8. The apparatus of claim 1, wherein the host computer is located physically apart from the portable apparatus.

9. The apparatus of claim 8, wherein said GIS and said database reside on said host computer, and wherein said GIS and said database are adapted to be downloaded from said host computer over said communication ports.

10. The apparatus of claim 8, further comprising a host information database, residing on said host computer, stored in said memory comprising sales information, for periodically displaying said sales information to the player.

11. The apparatus of claim 1, further comprising a textual and graphical information database residing on said national computer, wherein said textual and graphical information database is adapted to be downloaded from said national computer database over said communication port.

12. An apparatus for playing a game on a course, said game having one or more players, said apparatus comprising:
 a processor;
 a memory coupled to said processor;
 a display coupled to said processor;
 a data input device coupled to said processor;
 a geographic information system (GIS) stored in said memory, said GIS representing said course as an electronic map;
 a position locator stored in said memory and coupled to said GIS to indicate the position of the player on said electronic map;
 a performance database stored in said memory and coupled to said position locator for capturing statistical information from the player and generating recommendations to the player based on said statistical information to optimize the player's result; and
 a pager, wherein said pager allows messages to be transmitted to said player.

13. A method of collecting and applying statistical information in a computer-aided-game apparatus, said method comprising the steps of:
 (a) loading historical information from a host computer;
 (b) collecting statistical information from said golfer;
 (c) receiving positional data from a GPS receiver;
 (d) processing said positional data and said statistical information from said golfer with said historical information from said host computer;
 (e) providing analysis to said golfer and host computer;
 wherein said loading historical data comprises the step of downloading historical data from a national database.

14. The method of claim 13, wherein said collecting statistical information step includes the step of entering of said statistical information through said touch screen device.

15. The method of claim 13, wherein said receiving positional data step includes the step of obtaining GPS positional coordinates from a GPS receiver.

* * * * *

UNITED STATES PATENT AND TRADEMARK OFFICE
CERTIFICATE OF CORRECTION

PATENT NO.    : 5,810,680
DATED         : September 22, 1998
INVENTOR(S)   : Lobb et al.

It is certified that error appears in the above-identified patent and that said Letters Patent is hereby corrected as shown below:

<u>Column 5,</u>
Line 47, please replace "attitudinal" with -- altitudinal --.

<u>Column 10,</u>
Line 34, please replace "attitudinal" with -- altitudinal --.

Claim 2, please replace "apparatus" with -- system --.

Claim 3, please replace "apparatus" with -- system --.

Claim 4, please replace "apparatus" with -- system -- and replace "attitudinal" with -- altitudinal --.

Claim 5, please replace "apparatus" with -- system --.

Claim 6, please replace "portable golf game tracking device" with -- system --.

Claim 7, please replace "apparatus" with -- system --.

Claim 8, please replace "apparatus" with -- system --.

Claim 9, please replace "apparatus" with -- system --.

Claim 10, please replace "apparatus" with -- system --.

Claim 11, please replace "apparatus" with -- system --.

Signed and Sealed this

Eighteenth Day of September, 2001

*Attest:*

*Nicholas P. Godici*

*Attesting Officer*

NICHOLAS P. GODICI
*Acting Director of the United States Patent and Trademark Office*